July 9, 1935.  L. GLÖERSEN  2,007,799
APPARATUS FOR INTRODUCING FUSED CHEMICALS INTO LIQUID
Filed Nov. 30, 1932
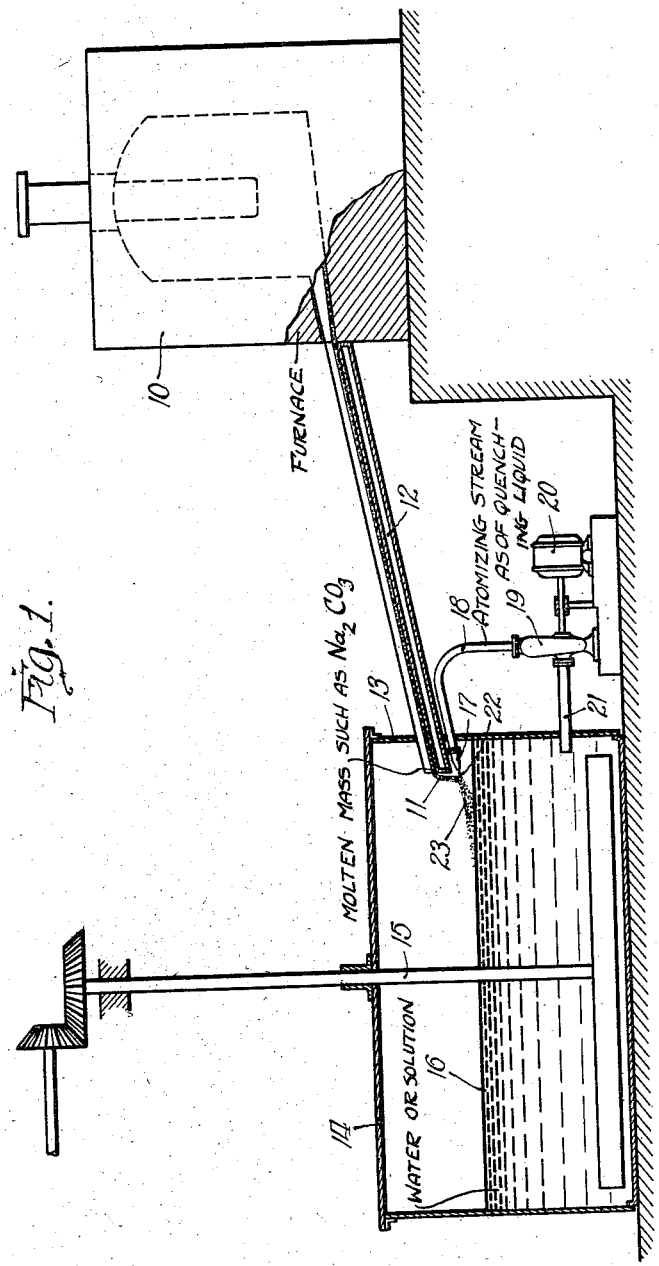
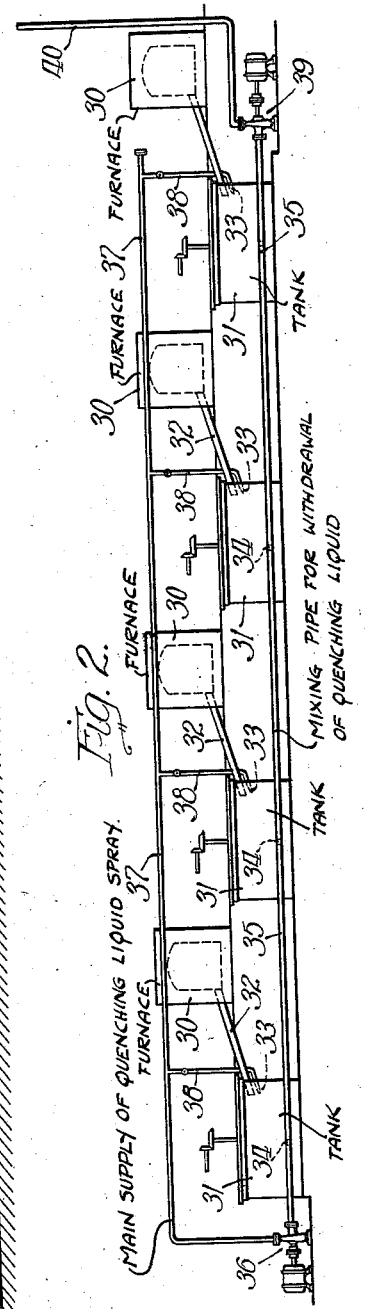
Inventor:
Leif Glöersen
By: Brown, Jackson, Boettcher & Dienner,
Attys.

Patented July 9, 1935

2,007,799

UNITED STATES PATENT OFFICE 2,007,799

APPARATUS FOR INTRODUCING FUSED CHEMICALS INTO LIQUID

Leif Glöersen, Ekenas, Finland, assignor to Fibre Making Processes, Inc., Chicago, Ill., a corporation of Illinois Application November 30, 1932, Serial No. 645,036
In Sweden December 8, 1931

2 Claims. (Cl. 23—285)

The present invention relates to the introduction of hot molten material into relatively cool liquid, and is particularly directed to a process and an apparatus for such introduction in a manner to avoid explosions, explosive forces, and attendant dangers.

The invention is of general application and is not limited to any particular chemicals or to any particular industry. It is particularly well suited, however, to the chemical pulp making field, and this use of the invention is chosen as the preferred use and for the purpose of illustrating the invention and the great advantages thereof. In addition to the general advantages certain incidental advantages may be obtained in specific uses of the invention. This holds true in the illustrative field where the invention may be so used that additional advantages are obtained of special significance in carrying on the cycle of pulp making, which cycle includes the recovery of chemicals.

In the manufacture of chemical pulp by certain processes an alkali metal base is used, usually a sodium salt. The waste liquor of the cooking process contains large amounts of organic residues. The liquor is concentrated to a solid or semi-solid condition and comprises the metal base, hereinafter referred to as the "soda base". The concentrated product is treated by high heat in an incinerator or smelter to burn out the organic matter and to convert the soda base largely to a sodium carbonate, with which minor quantities of other sodium salts may be found. In the industry, however, it is considered as sodium carbonate or "soda". As such, it is not ordinarily suitable for use in cooking liquor. Accordingly it is dissolved to form a solution of sodium carbonate which solution is then treated to convert the soda base into another and desirable form for future use. The most common practice is to treat the sodium carbonate with calcium oxide, or hydroxide, or lime, in what is known as "causticizing". By this treatment insoluble calcium carbonate is formed and a solution of caustic soda results which can be easily separated from the calcium carbonate.

The soda from the heat treatment, as in a smelter, is ordinarily discharged in a molten condition and is very hot, for example at 600° C. The common practice is to run a stream of the molten soda along a spout from the end of which it drops into a dissolving tank of water or solution, such as one containing sodium carbonate. Thus a concentration of sodium carbonate is built up in the tank. It is then withdrawn, in whole or in part, for the causticizing or other operations. Considerable danger and difficulty is encountered in the introduction of the fused soda into the dissolving tank.

The process is noisy, and large volumes of steam are formed. Steam and gas explosions occur. These frequently blow off covers, and damage the covers, the tank, and agitating apparatus which is frequently used. Steam and gases penetrate the buildings and carry a mist of chemical content into the air. The workmen as well as the apparatus are endangered in proportion to the frequence and violence of these explosions. Attempts to minimize the effects of the explosions have been made, for example by providing a deep well into which the fused soda drops. To some extent this is effective, but it adds to the dangers in other respects because the long distance through which the soda drops gives it a high velocity and the explosions occur deeper in the dissolving tank.

The present invention aims to overcome the difficulties heretofore encountered by preventing the explosions.

One object of the invention is to disperse the stream of fused material into small particles falling over a wide area.

A particular object of the invention is to break the stream of fused material by striking it laterally with a dispersing stream or jet of fluid moving at high velocity, such as a jet of air, steam, water or chemical solution, or a mixture of one or more of them.

Another object of the invention is the use of a soda solution as the dispersing jet for a fused soda.

Still another object is the use in a battery of units and as a jet, of the solution being formed, the solution for use as jets being drawn from all of the units, whereby a circulation is maintained between all of the units, resulting in a uniform concentration in all of the units.

Further objects and advantages of the invention will appear from the following description thereof, as it is illustrated herein by reference to its application in the pulp industry, as shown in the accompanying drawing, in which:

Figure 1 illustrates more or less diagrammatically a smelter discharging fused soda into a dissolving tank, and apparatus to disperse the stream of molten soda.

Figure 2 illustrates a battery of units such as shown in Figure 1, in which circulation is maintained between all of the tanks.

The apparatus comprises a smelter 10 which delivers fused sodium carbonate to an inclined trough or spout 12 from the lower end of which the molten sodium carbonate flows in a stream 11 into a tank 13 provided with cover 14 and agitator 15, and containing a liquid such as water or solution 16. In the present instance the spout 12 enters the side wall of tank 13 above the level of the liquid.

Means is provided to break up the stream of fused material dropping from the spout 12. A jet of suitable fluid is made to impinge upon the stream of fused material in order to break its normal gravitational course, to spread it over a larger area, and to break it into finer parts or globules. It is of course readily understood that the degree to which these results occur will depend in part upon the nature of the jet employed, and its relation to the stream.

I prefer to apply the stream laterally or substantially horizontally, at the under side of the stream. This is best accomplished by placing a jet-forming means, such as a nozzle 17, beneath the end of spout 12 within the tank 13. It is herein shown as arranged parallel to the spout, for mechanical convenience in installation, but the spout is only slightly pitched to secure flow therein, and the jet provided is substantially horizontal.

Although I may use a gas, air, steam, water, or solution, or a mixture of one or more of them, to feed the nozzle or other jet-forming means, I prefer to use liquid, preferably taken directly from the dissolving tank. An aqueous liquid is preferred because it chills the material more than does a gaseous fluid, and because steam is formed, which aids in distributing and breaking up the stream of fused material. In the preferred form and as illustrated, I provide a pipe 18 between nozzle 17 and a forcing means, such as a pump 19 operated by motor 20 to draw liquid from tank 13 through pipe 21 into the pump. In the operation of the pump a liquid jet 22 of solution 16 strikes the stream of soda and deflects it as shown at 23. The particles of soda become chilled by the liquid from the jet, and then fall gently into the tank without causing explosions, or with formation of many small explosions of no detrimental or objectionable character.

In Figure 2 I show a battery of smelters and tanks equipped as in Figure 1. However, rather than maintaining independence of the units, I may dispense with pump means for each tank and have a common pump which draws solution from all of the tanks to supply all of the nozzles.

In Figure 2 each unit comprises a smelter 30, dissolving tank 31, soda spout 32, nozzle 33, and liquid outlet 34. The liquid outlets 34 are connected to a common pipe line 35 at each end of which may be a pump. One pump 36 is a force pump which forces liquid at high pressures into a feed line 37 from which valved branch pipe lines 38 lead to the nozzles 33. Pump 39 draws liquid from all the tanks simultaneously and delivers soda solution through pipe line 40 to causticizing or other apparatus, not shown.

By reason of the use of the tank solution to supply the nozzles, it is possible to keep liquid circulating continuously to and from all of the tanks by the arrangement of Fig. 2. A uniform concentration is thus maintained in all of the tanks, and when this uniform concentration reaches the desired degree liquid can be withdrawn through pipe 40. In practice, this eliminates inspection or analysis of the solutions of the respective units, and creates other operating advantages which will be obvious to those skilled in the art.

While my invention is particularly adapted for the treatment of molten sodium carbonate, in its broader aspects it is applicable to other industries and the treatment of other materials. It is to be understood, therefore, that I do not limit my invention to the single use herein illustrated, by way of example only, but contemplate its application to all uses for which it is suitable, within the cope of the appended claims.

What I claim is:—

1. In combination, a battery of dissolving units each unit comprising, a tank for an aqueous liquid, means for dropping a fused soluble material into the tank for solution therein, and jet-forming means disposed to direct a liquid jet laterally onto said stream above the level of liquid in said tank, each tank having a liquid outlet, a pipe line connected to each of said tank outlets, forcing means connected to said pipe line, said forcing means being adapted to draw liquid from said tanks and to move the withdrawing liquid beyond the forcing means at relatively high pressure, and a pipe line connected to said forcing means for receiving said liquid under pressure and connected to each of said jet-forming means for supplying a liquid jet at relatively high velocity in each unit.

2. In combination, a battery of dissolving units each unit comprising, a tank for an aqueous liquid, means for dropping a fused soluble material into the tank for solution therein, and jet-forming means disposed to direct a liquid jet laterally onto said stream above the level of liquid in said tank, each tank having a liquid outlet, a pipe line connected to each of said tank outlets, means for withdrawing liquid from the pipe line and delivering it exteriorly of said units, and means for withdrawing liquid from the pipe line and supplying it under pressure to the jet-forming means of the respective units.

LEIF GLÖERSEN.